Feb. 23, 1926.
J. V. WECKBAUGH
MACHINE FOR MANUFACTURING PAPER CUPS
Filed Nov. 22, 1920     11 Sheets-Sheet 6

1,574,324

INVENTOR
Joseph V. Weckbaugh
BY
ATTORNEY

Feb. 23, 1926.
J. V. WECKBAUGH
1,574,324
MACHINE FOR MANUFACTURING PAPER CUPS
Filed Nov. 22, 1920   11 Sheets-Sheet 7
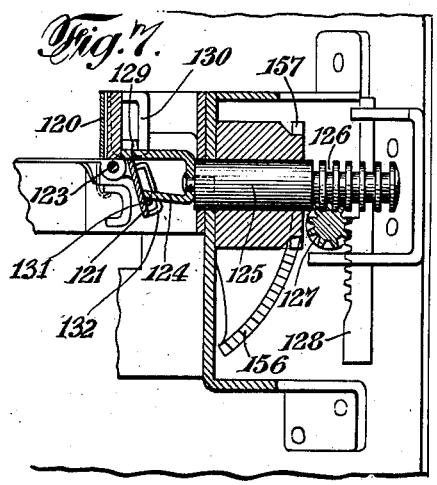
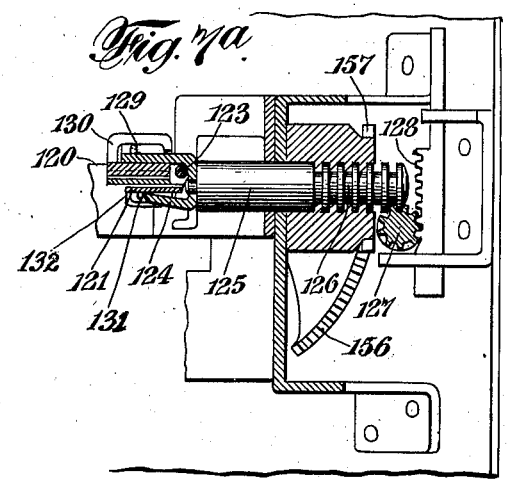
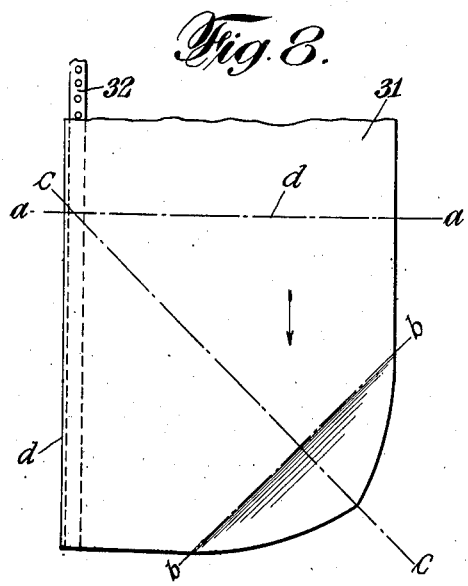
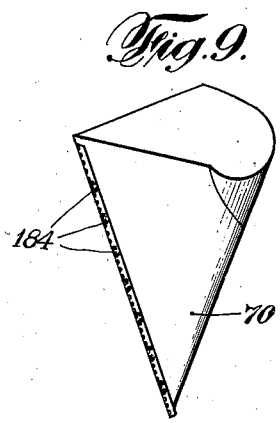
INVENTOR
Joseph V. Weckbaugh
BY
ATTORNEY Feb. 23, 1926.
J. V. WECKBAUGH
1,574,324
MACHINE FOR MANUFACTURING PAPER CUPS
Filed Nov. 22, 1920
11 Sheets-Sheet 8
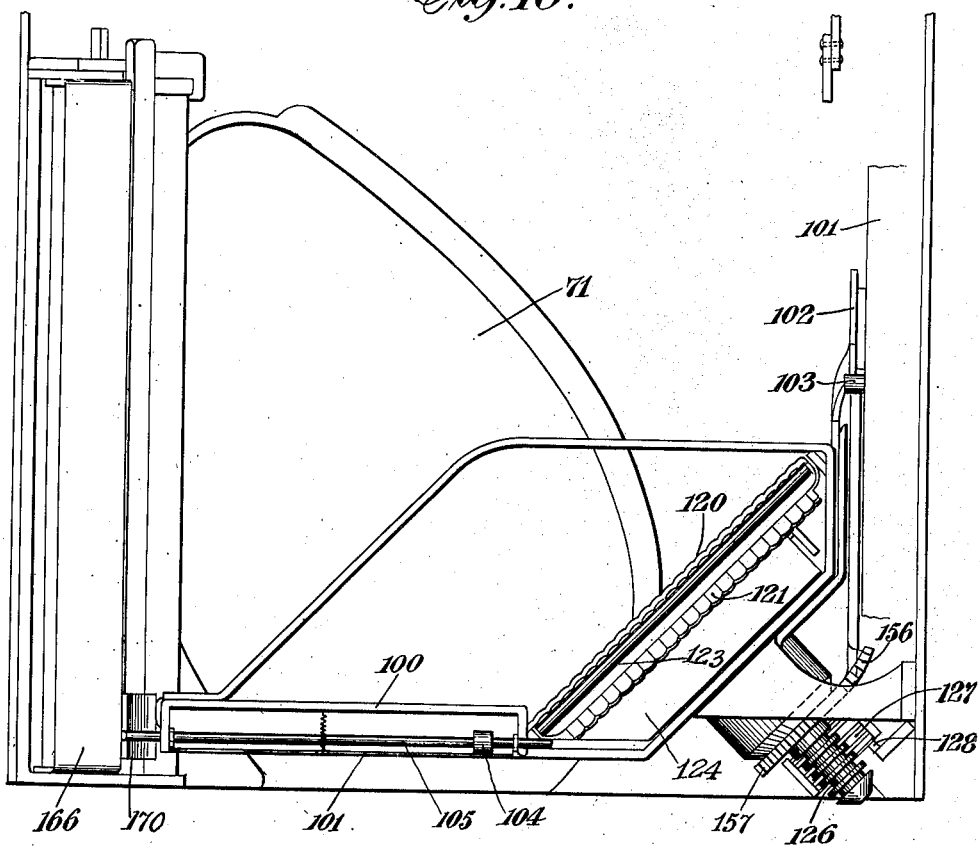
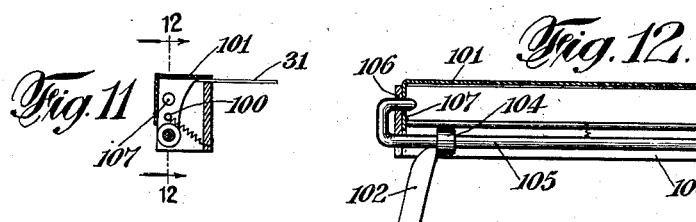
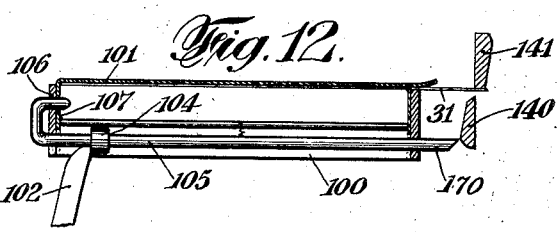
INVENTOR
Joseph V. Weckbaugh
BY
ATTORNEY Feb. 23, 1926.　　　　　　　　　　　　　　　　　　　1,574,324
J. V. WECKBAUGH
MACHINE FOR MANUFACTURING PAPER CUPS
Filed Nov. 22, 1920　　　　11 Sheets-Sheet 9

INVENTOR
Joseph V. Weckbaugh
BY
ATTORNEY

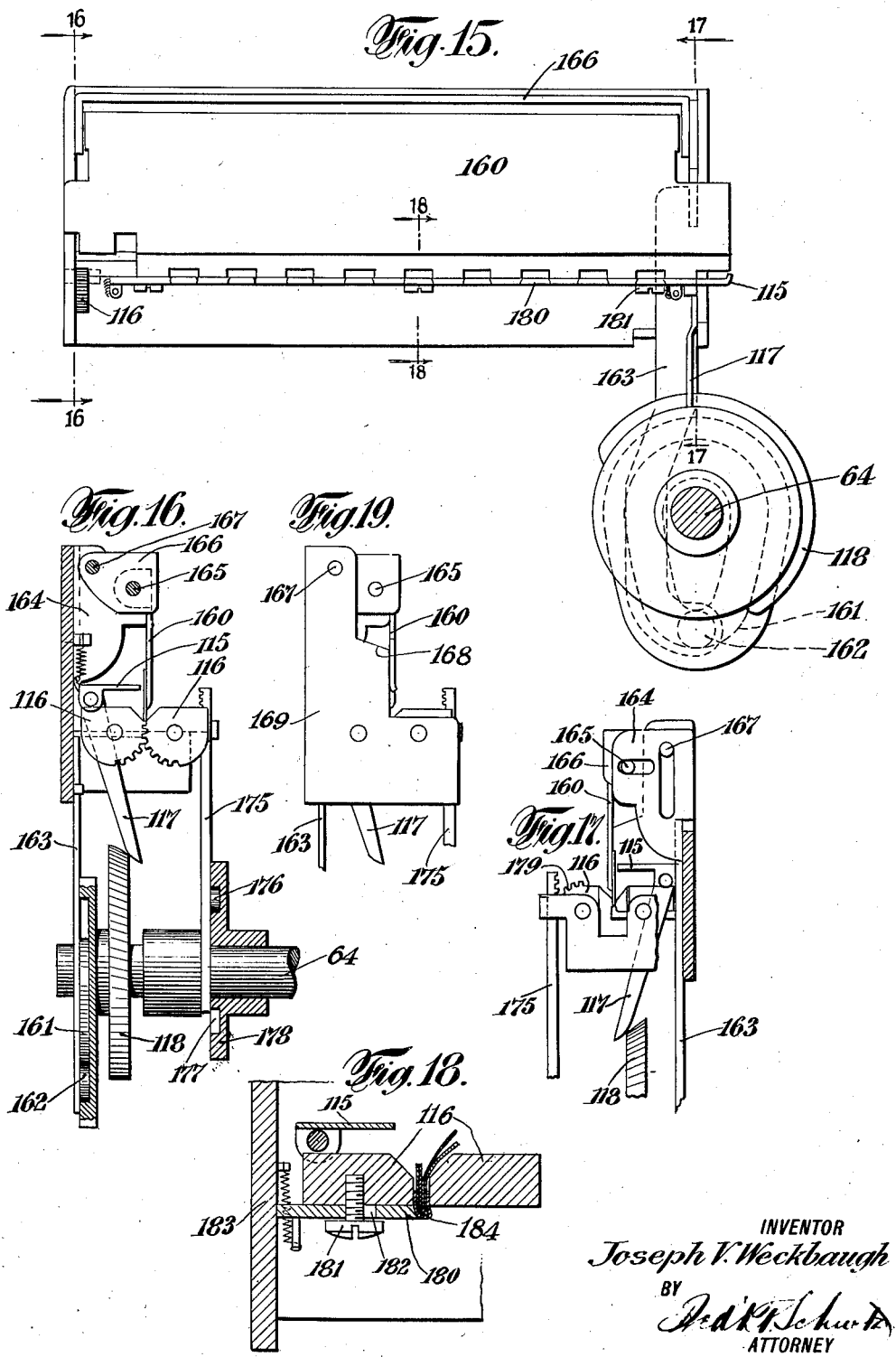

Feb. 23, 1926.
J. V. WECKBAUGH
1,574,324
MACHINE FOR MANUFACTURING PAPER CUPS
Filed Nov. 22, 1920  11 Sheets-Sheet 11
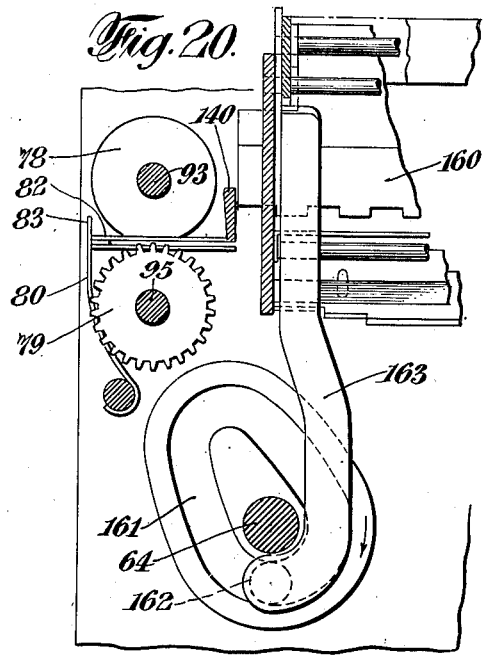
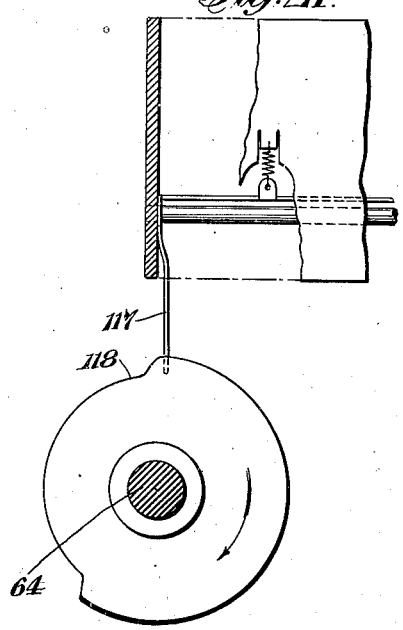
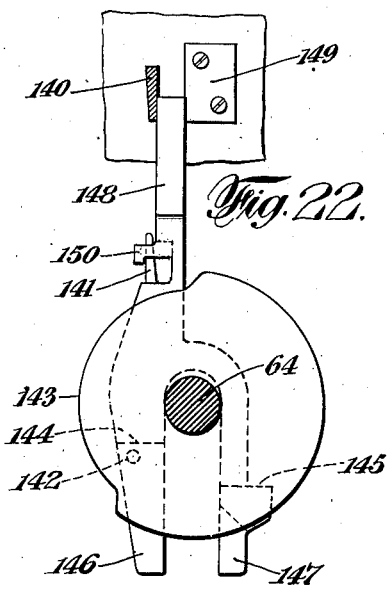
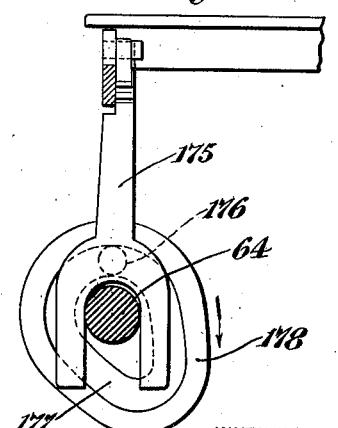
INVENTOR
Joseph V. Weckbaugh
BY
ATTORNEY Patented Feb. 23, 1926.

1,574,324

UNITED STATES PATENT OFFICE.

JOSEPH V. WECKBAUGH, OF NEW YORK, N. Y., ASSIGNOR TO AMERICAN CUPTOR CORPORATION, A CORPORATION OF DELAWARE.

MACHINE FOR MANUFACTURING PAPER CUPS.

Application filed November 22, 1920. Serial No. 425,800.

*To all whom it may concern:*

Be it known that I, JOSEPH V. WECK-BAUGH, a citizen of the United States, and a resident of New York, in the county of New York and State of New York, have invented certain new and useful Improvements in Machines for Manufacturing Paper Cups, of which the following is a specification.

The invention relates to mechanism for manufacturing a sanitary drinking cup or container of the character more particularly set forth in my copending applications Serial No. 297,762, filed May 17, 1919, Serial No. 396,342, filed July 15, 1920, Serial No. 410,202, filed September 14, 1920, and Serial No. 410,203, filed September 14, 1920, the present application being a continuation in part of the copending application Serial No. 297,762, filed May 17, 1919.

The invention has for its object to provide mechanism, suitably encased, whereby cups of this character may be manufactured in manner such that no portion of the material thereof need be handled during its course of manufacture, the cups being produced in a perfectly sanitary manner and from material which is also so arranged as to be protected against contamination. The said material of which the cup is to be constructed, as well as the mechanism for manufacturing the cup, is designed to be retained within the casing which, moreover, is preferably arranged to be movable as a whole in manner such that the mechanism may be presented for convenient replenishment of the cup forming material.

A further object of the invention consists in an arrangement of an outlet chute for the finished cup whereby the latter will be suitably delivered and presented with its handle, or rather gripping portion, upward in convenient position for removal of the cup from the casing. The cup may thus be produced and delivered entirely by mechanical means and in a strictly sanitary manner.

The invention has for a further object to afford a positive feed of the material of which the cup is composed and to provide mechanism for securely holding the paper blank cut therefrom during the formation of the cup. Still further objects of the invention consist in certain details of construction of the mechanism for effecting various operations involved in the formation of the cup.

The nature of the invention will best be understood when described in connection with the accompanying drawings, in which—

Fig. 7 is a fragmentary section taken on the line 7—7, Fig. 5, looking in the direction of the arrows; and Fig. 7ª is a similar view showing the crimping mechanism, set forth in Fig. 7, in the operation of crimping.

Fig. 8 is a diagrammatic view illustrating the paper blank and method of manufacturing the cup therefrom; and Fig. 9 is a perspective view of the completed cup.

Fig. 10 is a fragmentary plan illustrating the folding operation.

Fig. 11 is a sectional view taken on the line 11—11, Fig. 4, with a portion of the paper blank clamped thereby.

Fig. 12 is a longitudinal section of the paper clamping member and lock therefor, taken on the line 12—12, Fig. 11.

Fig. 15 is a fragmentary elevation of the binding mechanism.

Figure 14:
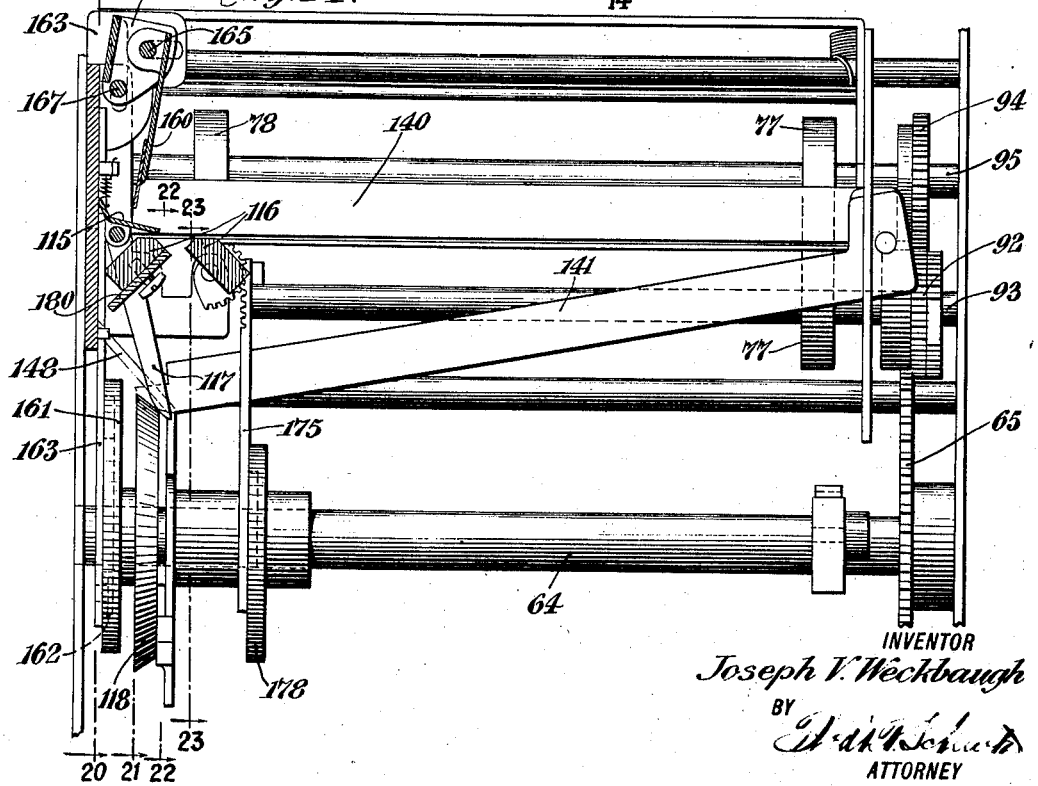
Fig. 14 is a fragmentary section taken on the line 14—14, Fig. 13.

Figs. 16, 17 and 18, are fragmentary sections taken respectively on the lines 16—16, 17—17 and 18—18, Fig. 15; and Fig. 19 is a fragmentary elevation illustrating a camming element employed in connection with the binding mechanism. Figs. 20, 21, 22 and 23, are fragmentary sections taken on the lines 20—20, 21—21, 22—22 and 23—23, Fig. 14, looking in the direction of the arrows.

Similar characters of reference designate corresponding parts thruout the several views.

Figure 1:
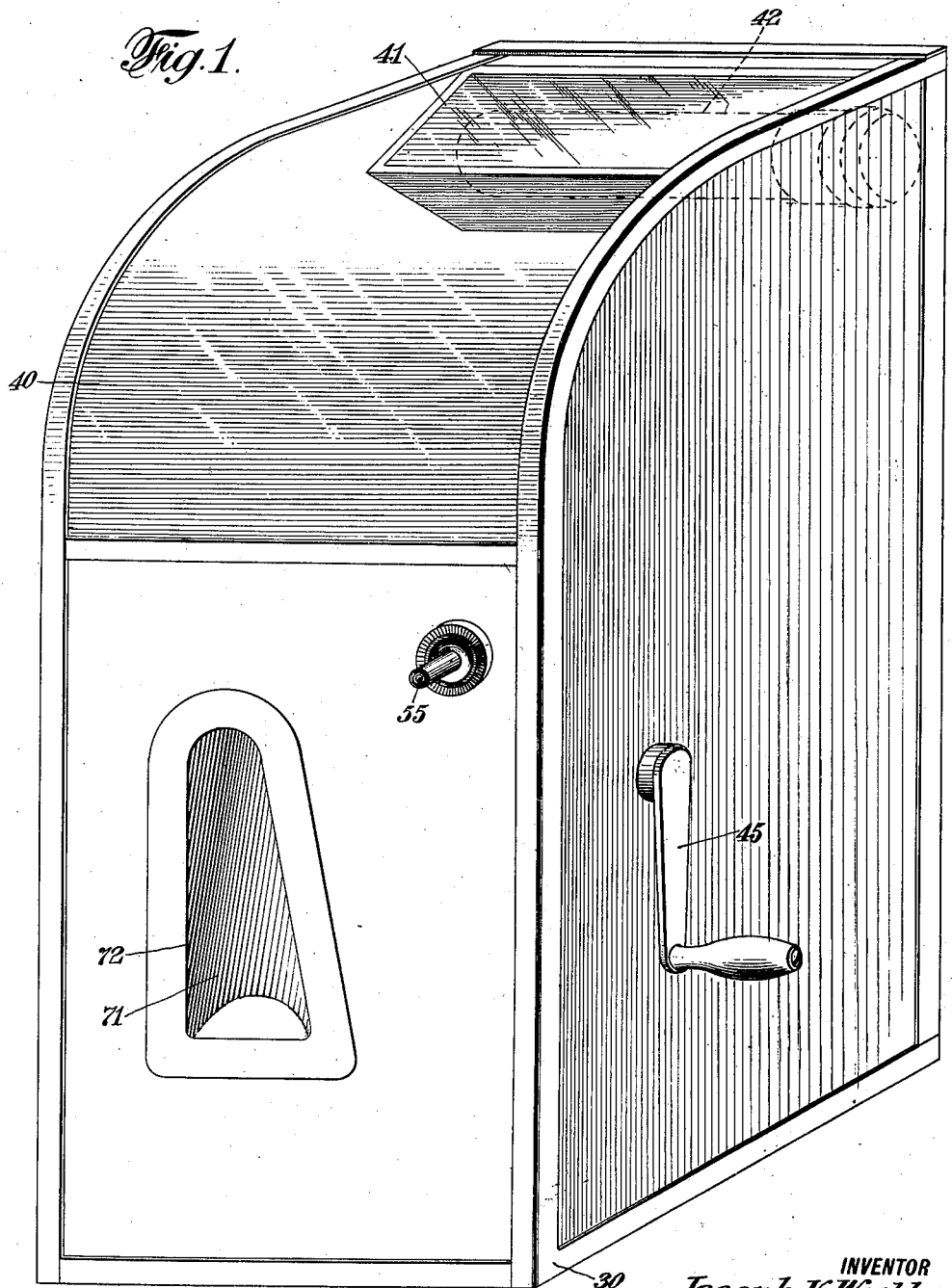
Fig. 1 is a perspective view of the casing for the cup forming mechanism; and shows also the outlet chute and operating handle for manually actuating the mechanism, as well as the plunger for releasing the locking mechanism.
Figure 2:
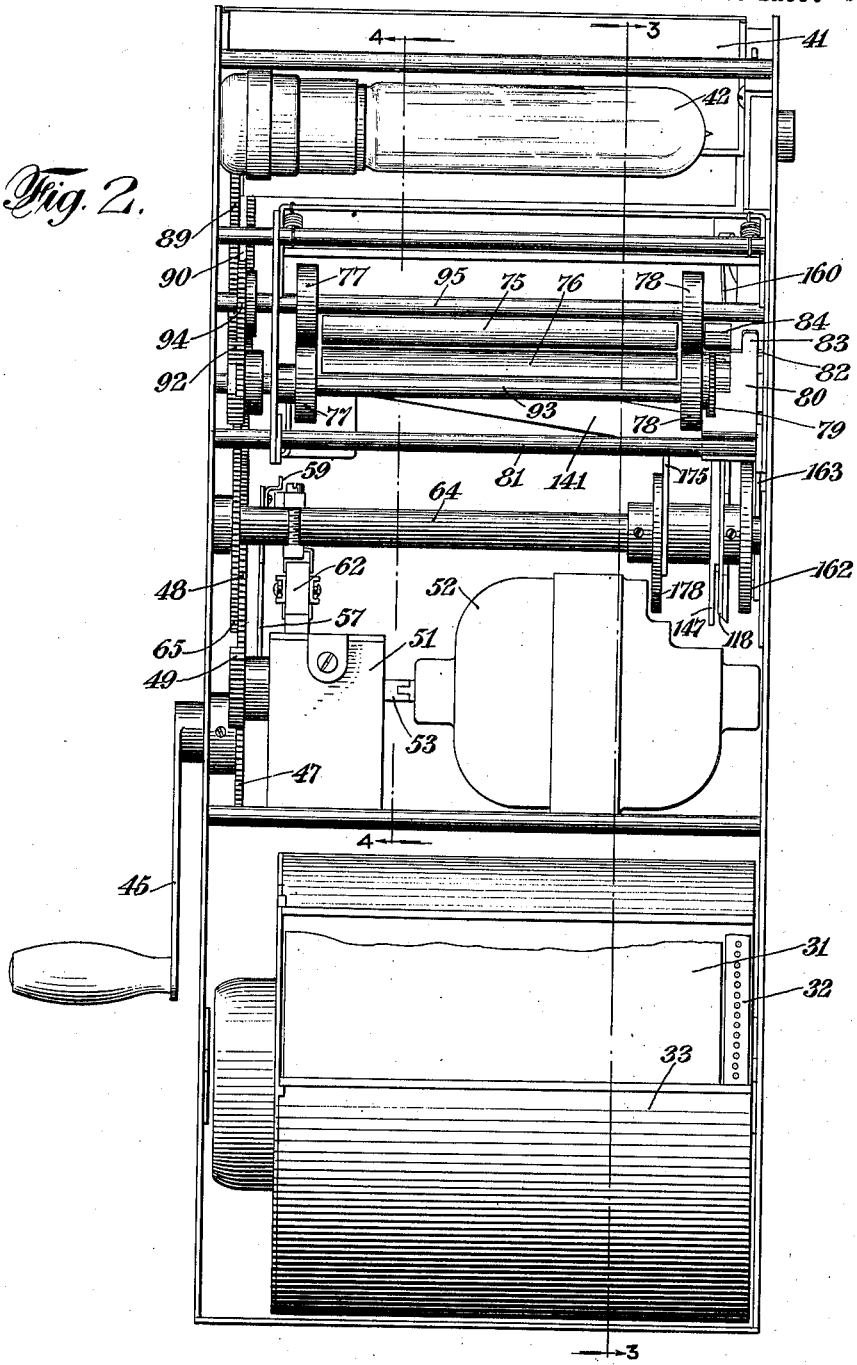
Fig. 2 is a rear view of the mechanism— the back plate of the casing having been removed.

Referring to the drawings, the mechanism for forming the cup is designed to be retained within a suitable casing 30, Fig. 1, which retains also, preferably in the bottom thereof, a supply roll 31 of paper from which the cup is to be formed, together with a strip of perforated metal binding material 32, Fig. 2. The paper roll 31 is preferably engaged in a suitable cylindrical container 33; and when it is desired to replenish the stock of paper and metal binding strip, the same may be readily effected by swinging forward the entire casing 31 which is for this purpose hinged at the bottom to a back plate 34, the latter being suitably attached to a proper support or wall 35 upon which the cabinet is hung. Normally, in its closed position, the casing is locked in any convenient manner to the back plate 34 by a suitable lock device 36.

The upper portion of the casing is preferably formed of a transparent cover portion 40 permitting of inspection of the interior of the casing and allowing of viewing the operation of forming a cup. At the upper portion, furthermore, near the back may be provided a display member 41 as of suitable translucent material behind which is located an electric lamp 42 which may be permanently lighted; or, if desired, be arranged to be energized only when the machine is being operated to form a cup, as is well understood, said lamp also serving to illuminate the interior of the casing.

Figure 4:
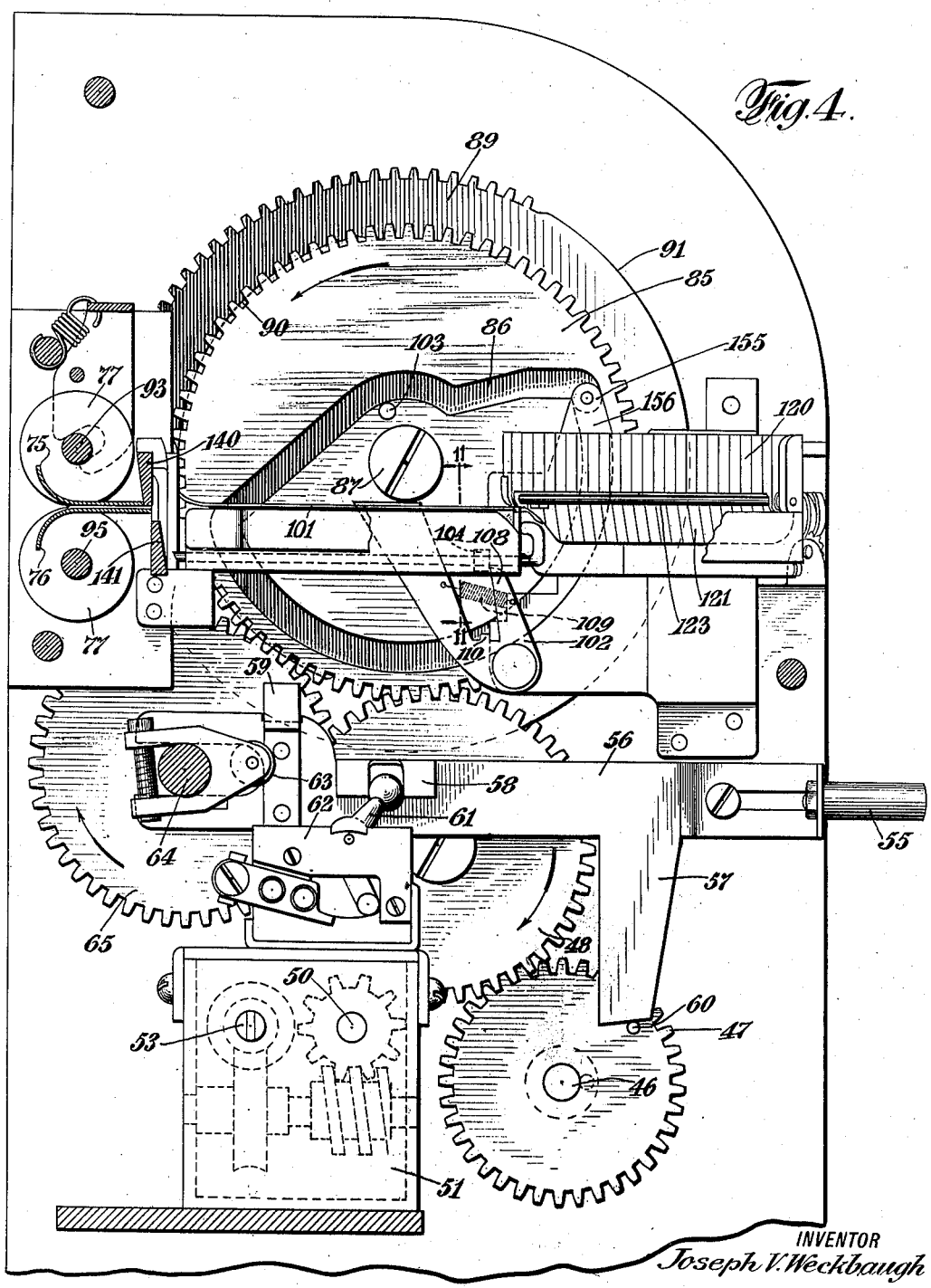
Fig. 4 is a vertical section taken on the line 4—4, Fig. 2, looking in the direction of the arrows.
Figure 5:
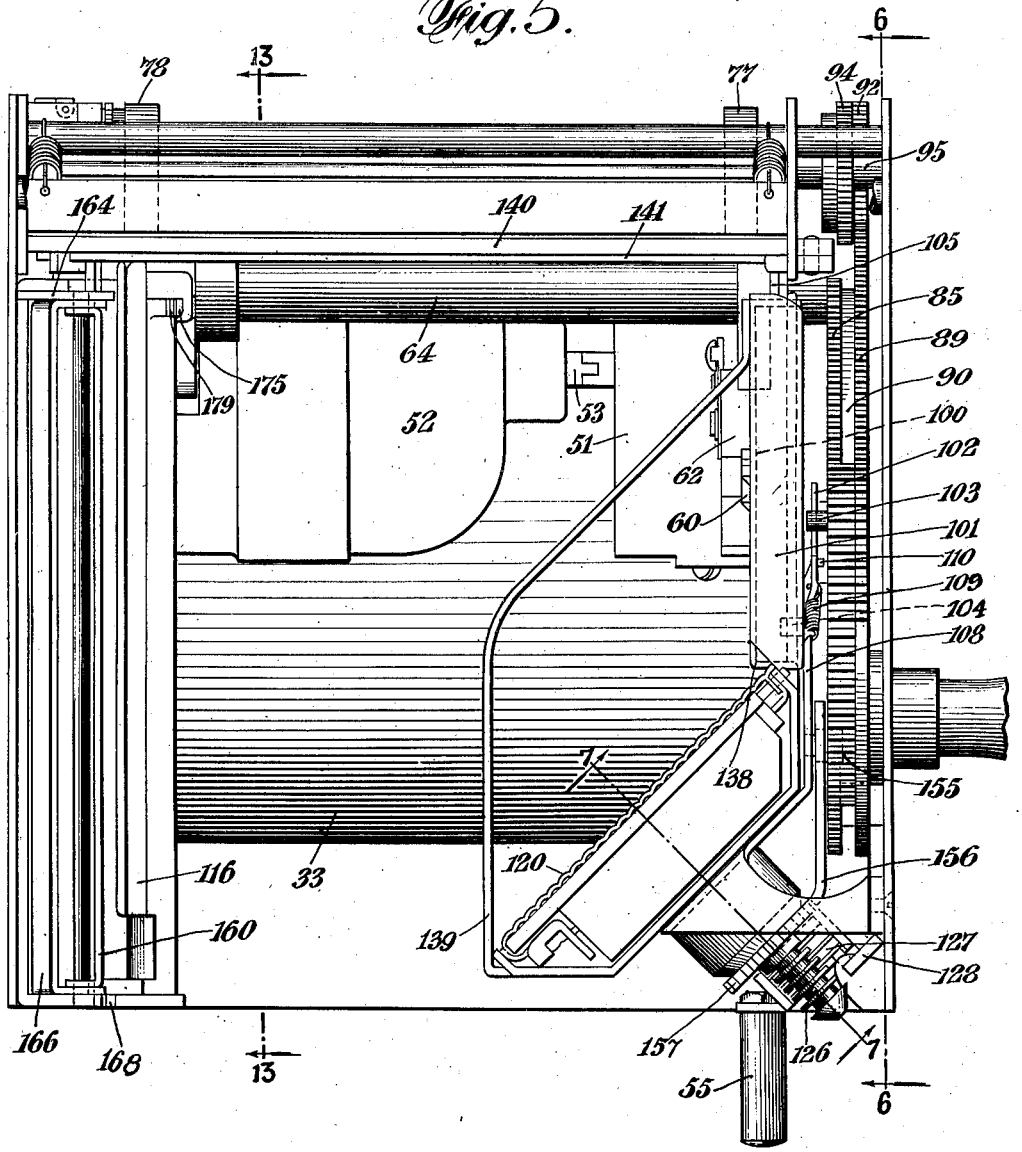
Fig. 5 is a plan of the machine with upper portion of casing removed as well as the electric lamp.
Figure 6:
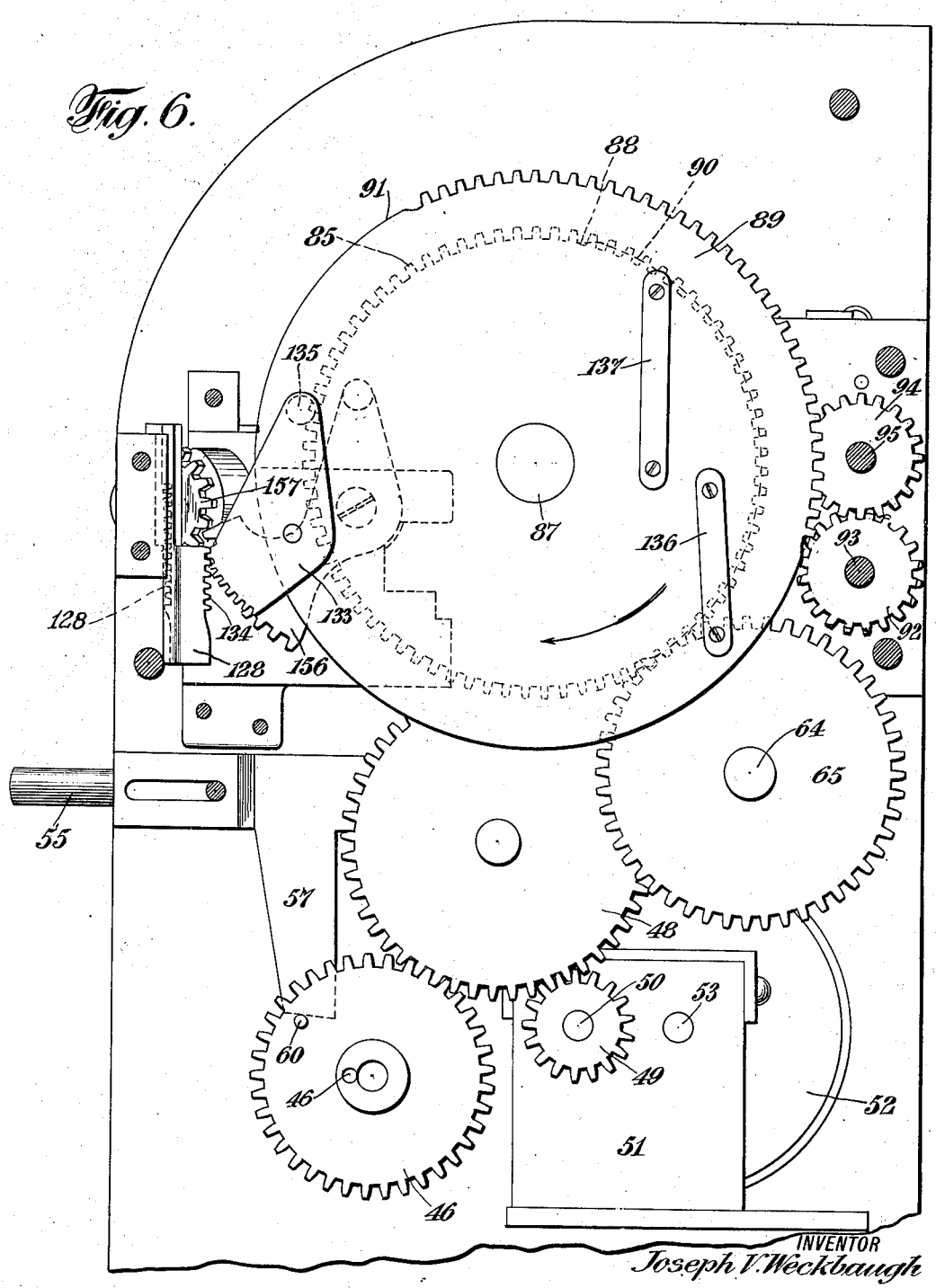
Fig. 6 is a vertical section taken on the line 6—6, Fig. 5, looking in the direction of the arrows.
Figure 13:
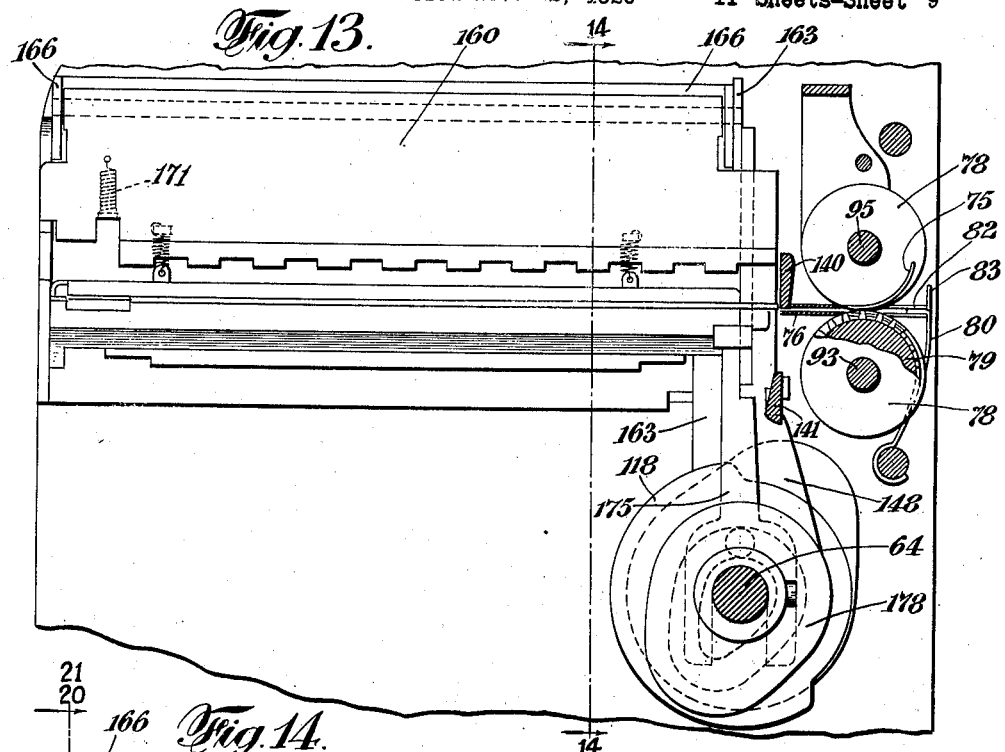
Fig. 13 is a fragmentary section taken on the line 13—13, Fig. 5.

The actuation of the mechanism may be effected either manually or electrically; or, if desired, the machine may be provided with both means af actuation, as shown, so that in the event of one or the other failing, the machine may still function. To this end, a crank handle 45 projects from the side of the casing 30 and is designed to engage and rotate a shaft 46 carrying a driving gear 47 which in turn meshes with a gear wheel 48 of the driving train. This latter gear wheel 48 meshes also with a pinion 49 on a shaft 50 extending from a transmission casing 51 transmitting power received from an electric motor 52 through a power shaft 53. Thus, the driving gear 48 may be rotated either from the crank handle 45 or the motor 52. It is preferred, in this connection, to provide interlocking means whereby the number of revolutions either the motor or crank handle are limited to the proper number required for forming the cup, said means being suitable also in the event that the machine is to be coin-controlled as in vending the cups. To this end, a plunger 55 is shown projecting from the front of the casing, the same being continued within the casing as a bar 56 having a downwardly projecting arm 57, a fork member 58 and a projection 59 at the inner end. The lower edge of the arm 57 is designed to engage a pin 60 projecting outwardly from the crank gear wheel 47 and thus preventing rotation of this wheel so long as the parts are in position indicated in Fig. 4. The fork 58 engages the ball-ended lever 61 which controls suitable electric contacts of a contact block 62, whereby the current supply to the motor 52 is controlled in manner well understood. So long as the conditions are as set forth in Fig. 4, the mechanism may not be actuated either thru the crank handle 45 or the motor 52; but when the plunger 55 is pushed inwardly, pin 60 is released of contact with the lower edge of arm 57 and electrical contact is made thru the movement of lever 61. Thereupon, and after the requisite number of revolutions of wheel 48 have been effected, bar 56 is restored to its normal position through contact of a roller 63 with the projection 59 at the inner end of the said bar, the roller 63 being carried by a shaft 64 actuated from a gear wheel 65 in the gear train. In this manner, the necessary movements are imparted to mechanism hereinafter described for effecting the manufacture of a cup 70, Fig. 9, from the strip of paper 31 which is arranged to be cut along a line $a$—$a$, Fig. 8, to provide the blank substantially in the form of a square. This blank is designed to be turned over substantially along the line $b$—$b$ at right angles to the diagonal $c$—$c$ of the blank, and the two full-length edges $d$—$d$ being caused to register by turning or folding over the said blank substantially about the diagonal $c$—$c$, whereupon these edges are secured to each other as by being bound by the perforated metal strip 32, all of which is more fully set forth in my aforesaid copending application Serial No. 297,762.

Figure 3:
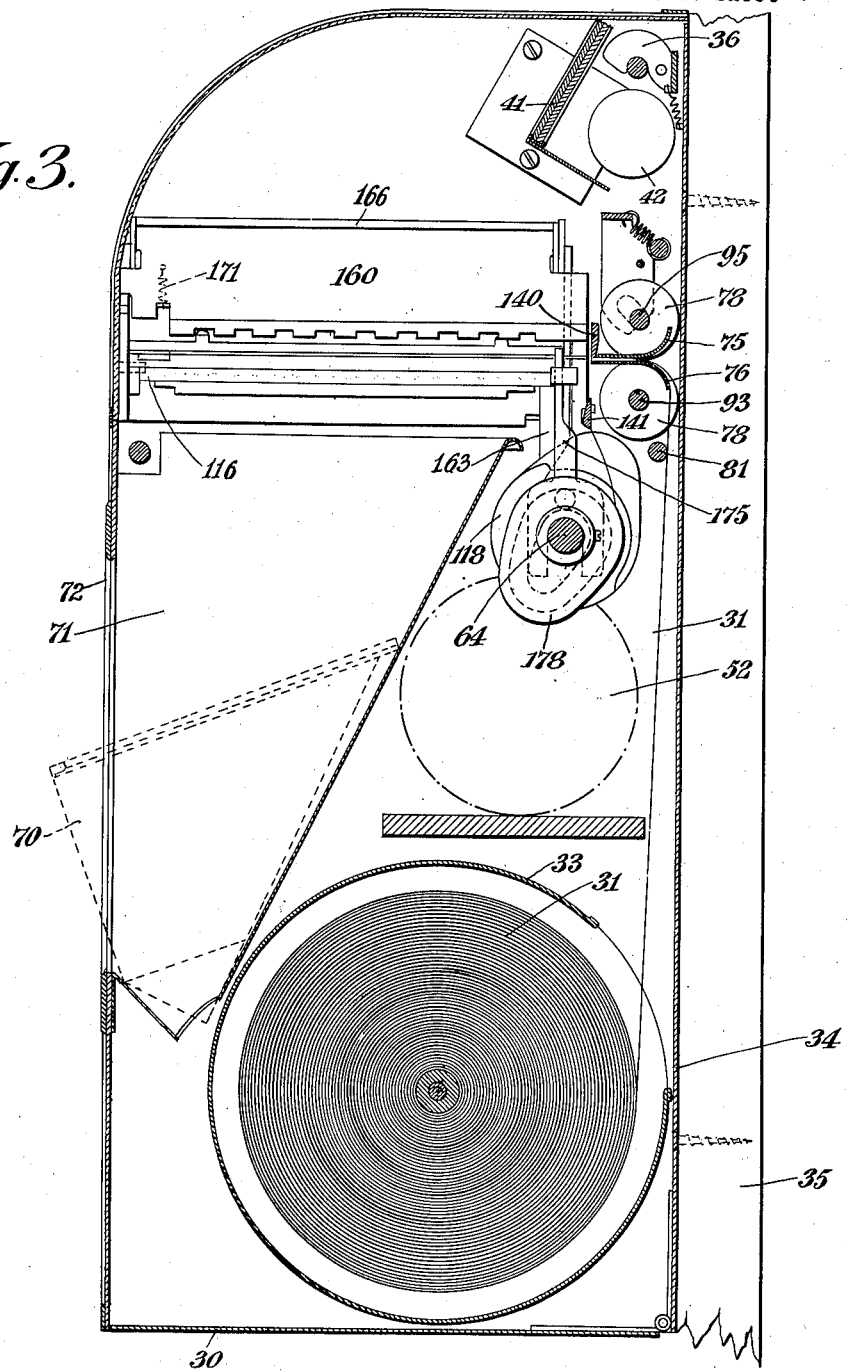
Fig. 3 is a vertical section taken on the line 3—3, Fig. 2, looking in the direction of the arrows—a finished cup, also, being indicated in phantom lines.

The completed cup 70 is then discharged by gravity into a chute 71 having an outlet 72 at the front of the casing. The bottom of the chute extends, preferably, below the outlet 72, as more clearly shown in Fig. 3, to locate the mouthpiece of the cup 70: and the bottom of this extension is cut away, not only to permit of discharge of any foreign matter which might possibly accumulate within the chute but also to insure that the edge of the mouthpiece does not even contact with the walls of the chute, said finished cup assuming a position substantially as indicated in Fig. 3, presenting the bound edges to afford a convenient portion in grasping the cup to remove same from the chute. The operation of forming the cup is entirely automatic, and it will be appreciated that the same is effected in an absolutely sanitary manner as the material of which the cup is composed is not accessible from the time it is inserted into the cabinet until the completed cup is discharged and ready for use.

To feed the cup forming material from the roll 31 as well as simultaneously therewith and beneath same the binding strip 32, the said paper is brought, as indicated in Fig. 3, between a pair of transverse guide shoes 75 and 76 serving to guide the paper between two sets of cooperating feed rollers 77 and 78, the lower of the pair of rollers 78 carrying also a toothed wheel 79 for engaging the perforations of the metal binding strip 32. The tops of the teeth of said wheel are arranged substantially flush with the periphery of the paper feed rolls; and the said metal strip is held and guided to the wheel 79 as by means of a spring shoe 80 fastened on a tie rod 81 and embracing a portion of the wheel 79. The spring shoe 80, moreover, is designed to be locked at its upper portion into a suitable spring socket 82, a finger 83 projecting from the shoe 80 to permit of readily releasing the same therefrom as in threading the said strip. A portion 84 of the upper guide 75 is extended over the wheel 79 to guide the strip along with the paper, the said strip, due to the reduced periphery of its feed roll, being fed forward at a slightly lesser rate than the paper.

The motion for rotating the feed rollers 77 and 78 and the sprocket 79 for advancing the paper and the metal binding strip respectively is effected as follows from the wheel 48 of the driving train. This wheel 48 meshes with the inner gear wheel 85 of a set of gear wheels and is provided on its face with a cam groove 86. On the same shaft 87 on which the gear wheel 85 is mounted, are an intermediate gear wheel 88 and an outer gear wheel 89, all being rotatable with said shaft. Both of these last named gear wheels are of the mutilated type having portions 90 and 91, respectively, free from gear teeth and designed to effect a dwell during which certain of the operations are suspended. The rotation of the gear 89, imparted thereto thru the rotation of shaft 87, and which in turn derives its motion from the source of power thru the intermediate train of gears, effects rotation of a double gear wheel 92, with one side of which it is in mesh, on a driving shaft 93 of the lower of the feed rolls 77 and 78; and the other side of the gear 92 meshes continuously with a gear wheel 94 on the shaft 95 of the upper of the feed rolls 77 and 78. The gear wheel 92, moreover, is suitably mutilated and timed to effect a dwell after the desired amount of paper has been fed between said rolls 77 and 78, the gear portion 91 conforming thereto.

During the feeding of the paper and metal strip the same are guided along the respective edges by suitable means which serve also to subsequently clamp same, as follows, reference being had more particularly to Figs. 4, 5, 11 and 12, for the one side of the machine. The guide member is shown to consist of a vertically disposed frame piece 100 to which is pivoted an overhanging spring-drawn clamp member 101 between which two members the paper is designed to be fed, the inner edge of the member 101 being upturned for the purpose of readily guiding the forward edge of the paper therebetween. When the paper 31 has been fed forward to the required extent, clamp 101 is arranged to be drawn down on the upper edge of piece 100 thru the action of a bell crank 102, Fig. 4, whose one arm is designed to be engaged by a pin 103 projecting from the face of the wheel 85. To effect this depression of the clamp 101 and at the same time lock the same in this position to the frame piece 100 the bell crank 102 is designed to engage an enlargement or block 104 of a rod 105 slidably mounted in the frame piece 100. The one end of rod 105 is designed to enter two openings 106 and 107, respectively, in the frame piece 100 and the clamp 101, which openings have been brought into registry by the action of clamp 101 in abutting an extension frame piece 108, Fig. 5. As the end of rod 105 passes thru these openings under the action of bell crank 102, the clamp 101 is cammed down to secure the paper 31 along its edge and the same is held in this position until released at the proper time. In the meantime, pin 103 leaves the surface of the bell crank arm and the bell crank is restored to its normal position under the action of a spring 109, being limited in its movement by a suitable stop 110.

Along the other side of the machine, the paper and strip are guided and clamped by means of a pivoted spring-drawn clamp 115 mounted above a rotatable member 116, between which and the said clamp 115 the paper is guided and subsequently clamped thereto under the action of arm 117 working on a beveled cam surface 118 of a cam member mounted on the cam shaft 64. As soon as the required amount of paper has been fed forward and laterally guided as set forth, the clamping is effected along the two opposite edges of the paper blank, whereupon the paper is to be cut to form the blank, as along the line a—a, Fig. 8.

During the forward feeding movement of the paper, its forward corner has been deflected by engagement with a corrugated impression forming member 120 to turn over the corner, as shown in Fig. 8, the same then being arranged to be folded over as about the line b—b, Fig. 8.

This is effected by means of a pair of jaws, the member 120 of which constitutes the upper of the jaws and a member 121 the lower thereof. These jaw members are pivoted on a rod 123 and are designed to be closed thru the action of a forwardly moving U-shape shoe 124 which in its two positions of maintaining the jaws open and closed is shown respectively in Figs. 7 and 7ª. The U-shape shoe 124 is carried at the inner end of a plunger 125 whose reciprocation is effected thru engagement of its outer end, provided with a series of circular grooves 126, with the teeth of a pinion rod 127. The latter, in turn, is rotated by a vertically disposed rack 128 in engagement therewith. As the rack 128 is elevated, pinion 127 is rotated and thru its engagement with the circular grooves 126 of the plunger 125 drives forward the said plunger and attached shoe to effect the closing of the jaws. Similarly, as the rack is depressed, the plunger is retracted and the jaws permitted to open by positive engagement of a projection 129 of the U-shape shoe with an extension 130, and the lower jaw is positively opened thru engagement between a projection 131 of the U-shape shoe and an extension 132 of the lower jaw, thus restoring the mechanism.

The faces of these jaw members are preferably corrugated or otherwise suitably roughened, corresponding impressions being formed upon the turned over corner and serving to set the paper in its folded position and to facilitate the subsequent turning operation, as well as assisting in retaining the form of the finished cup.

Motion for actuating the rack member 128 is derived from the rotation of wheel 89 thru a pivoted segmental gear member 133 engaging a further set of teeth 134 of said rack member. The segmental gear 133 carries a roller 135 designed to be engaged by block 136, which is secured to the face of said wheel 89, for closing the jaws; and a similar block 137 is secured thereon for opening same, said blocks and roller 135 serving respectively to raise and lower the said rack member 128.

Moreover, the structure is such that with upper leg of the U-shape member 124 somewhat longer than the lower leg, the paper will be held by the upper jaw member 120 against an exposed portion 138 of piece 100 and a guide 139 carried by said piece 100, thereby predetermining the line of fold.

The paper blank with folded corner is then in condition for the turning operation except that the operation of severing the blank from the strip must be completed. To this end, a stationary upper blade 140 is provided and cooperates with a movable pivoted blade 141 to cut the paper which has been fed between same as hereinbefore disclosed. Motion for actuating the movable blade 141 is derived from the cam shaft 64 thru the action of a pin 142 extending from the face of a cam disk 143 and engaging surfaces 144 and 145 respectively, on arms 146 and 147 of a bifurcated member 148, straddling shaft 64 and which member is further guided between a face of the upper stationary blade 140 and a frame block 149. The lower movable blade 141 is carried by the member 148, being mounted within a guiding hook 150 thereof to accommodate the set of the blade as member 148 ascends to cut the paper.

The entire jaw mechanism with corner of paper blank folded and the actuating plunger therefor, together with the lateral clamping member 101, are rotatable as a whole about the axis of the said plunger. Said axis coincides substantially with the diagonal c—c of the paper blank, whereby the edges d, d will be caused to register, and the same are subsequently to be bound with the metal binding strip 32 as hereinafter set forth.

The motion for effecting rotation of the jaws and cooperating mechanism is obtained from the rotating gear wheel 85 thru a roller 155 fitting the cam groove 86 in the face of said wheel. Roller 155 is carried by a segmental gear 156 which registers with a gear wheel 157 rotatable with the plunger 125, rotation of the plunger being permitted thru the circular grooves 126 of its outer end and in engagement with the teeth of pinion rod 127.

The paper blank with its two lengthwise edges d, d registering is now in position for the final action of binding the metal strip 32 thereover and release of the finished cup. To this end, a vertically disposed plate 160 is mounted to reciprocate downwardly over the registered edges of the paper, at the same time having a movement over same to provide for suitable clearance. This motion of the plate 160 is effected from the cam shaft 64 thru a cam groove 161 and roller 162 attached to an upwardly extending arm 163 which has a lateral slotted extension 164 into which fits a pin 165 extending from a carriage 166 in which swings, about suitable pivots, the plate 160. As the arm 163 is reciprocated, that is to say in its downward movement, it not only will draw with it downwardly the carriage member 166 but rocks this outwardly about a rod 167 by which it is pivoted to the frame. This downward and outward movement is predetermined by a suitable guide surface 168 of an end plate 169.

The plate 160 descends until it effects a secure hold upon the paper and the metal binding strip beneath same. Thereupon, the elements to be bound, being secured, the clamp member 101 releases the corresponding edge held thereby, thru the action of the outer face of said plate 160 contacting with the projecting end 170 of rod 105 which forces the opposite in-turned end of the rod 105 out of the opening 107 to permit of the retraction of the spring-drawn clamp member 101. Simultaneously cam 118 releases the paper and metal binding strip from between clamp 115 and member 116, thereby enabling the material to be drawn downwardly for the binding operation. The plate 160 is drawn inwardly by means of a spring 171, and is considerably reduced in thickness along its lower edge, as shown, to facilitate its withdrawal during the binding operation. As the plate 160 continues to move downwardly, the paper and metal are drawn thereby between the coacting jaw members 116 to the proper extent, Fig. 18, and simultaneously therewith the said coacting jaw members close to turn over the edges and bind the metal strip 32 about same. Plate 160 is then withdrawn under the action of the cam groove 161 as soon as the jaws take sufficient hold. Jaw members 116 are operated from the cam shaft 64 thru a rack member 175 having a roller 176 engaging a cam groove 177 of cam 178 on the said cam shaft 64. The rack member 175 engages teeth 179 of one of the jaw members 116 which are in toothed engagement with each other.

The cup is now practically complete, but before same is released by the jaw members a sealing action is effected on the metal strip bound about same to insure against it becoming detached from the bound over paper edges. This is effected during the final stages of binding in that to one of the jaw members 116 there is attached a toothed sealing member 180, as by means of screws 181 passing thru a slot 182 thereof, the same being spring held toward a frame portion 183. Member 180 is designed to be forced outwardly toward the bound over edges which extend slightly below the lower face of the jaws, as more clearly shown in Fig. 18. This member 180 is toothed, as indicated in Fig. 15, thereby upsetting certain of the relatively narrow portions of the metal which lie between the perforations as shown at 184 which prevent the slipping off of the metal binding strip 32 from the bound paper edges. Thereupon, further rotation of the cam shaft 64 opens the jaws to release the completed cup which under the influence of gravity drops into the chute 71, sliding therein to the position indicated in dotted lines, Fig. 3, with a portion projecting slightly beyond the front of the casing, the metal bound edges being uppermost and affording a convenient portion for grasping the cup to remove same from the casing.

I claim:

1. In a machine of the character described for making conical, metal bound paper cups: a casing, and an apertured outlet chute shaped to receive the completed cup in inverted position with its bound edge forward and having a front portion to retain the cup in the chute.

2. In a machine of the character described for making conical, metal bound paper cups: a casing, and an apertured outlet chute shaped to receive the completed cup in inverted position with its bound edge forward and having a front wall to retain the cup in the chute, and the bound edge protruding thru the aperture beyond the casing.

3. In a machine of the character described for making conical, metal bound paper cups: a casing, and an apertured outlet chute shaped to receive the completed cup in inverted position with its bound edge forward, the bottom of the chute being open and below the aperture of the casing and having a front wall to retain the cup in the chute.

4. In a paper cup making machine of the character described, including mechanism to advance a strip of paper and mechanism to sever same into predetermined lengths: means to fold a corner of the paper, and means to positively grip a portion of the paper during the folding operation to predetermine the line of fold.

5. In a paper cup making machine of the character described, including mechanism to advance a strip of paper and mechanism to sever same into predetermined lengths: upper and lower jaws to fold a corner of the paper, and a bifurcated member to engage same, one leg of which is longer than the other.

6. In a paper cup making machine of the character described, including mechanism to advance a strip of paper and mechanism to sever same into predetermined lengths: upper and lower jaws to fold a corner of the paper, and a bifurcated member to engage same, one leg of which is longer than the other, and an abutment for the jaw engaged by the longer leg of said bifurcated member.

7. In a paper cup making machine of the character described: mechanism for advancing a strip of paper and a strip of binding material; mechanism for guiding and holding same along the sides thereof; mechanism for forming the mouthpiece of the cup; mechanism to sever the paper and binding strip; mechanism to register the lengthwise edges of the paper; and mechanism to seal the said binding strip to said edges of the paper.

8. In a paper cup making machine of the character described: mechanism for advancing a strip of paper and a strip of binding material; mechanism for guiding and holding same along the sides thereof; mechanism for forming the mouthpiece of the cup; mechanism to sever the paper and binding strip; mechanism to register the lengthwise edges of the paper; mechanism to bind said registered edges with said binding strip; and mechanism to seal the said binding strip to said edges of the paper.

9. In a machine of the character described, a paper supply roll; a metal strip supply; means for feeding the paper and a metal strip so that the paper is above the metal strip; means for cutting the paper to form a blank and for folding it to bring two of its edges into coincidence; and means for folding the coinciding edges of the blank and for clamping the metal strip about the folded edges.

10. In a machine of the character described, a paper supply roll; a metal strip supply; means for feeding the paper and a metal strip so that the paper is above the metal strip; means for cutting the paper to form a blank and for folding it to bring two of its edges into coincidence; and means for folding the coinciding edges of the blank and for clamping the metal strip about the folded edges; and means for sealing the same thereto.

11. In a machine of the character described, a paper supply roll, means for feeding the paper a predetermined distance, means for holding one longitudinal edge of the paper, means for cutting the paper to form a blank, means for gripping the blank at a point removed from said edge and for bending the blank about a diagonal axis to bring an adjacent edge of the blank substantially into alignment with said longitudinal edge, means adapted to engage marginal portions of the blank and hold the same together, with said edges in alignment, mechanism adapted thereupon to release said first-mentioned holding means, and means for creasing the said blank substantially parallel to said edges.

12. In a machine of the character described, a paper supply roll, means for feeding the paper a predetermined distance, means for holding one longitudinal edge of the paper, means for cutting the paper to form a blank, means for gripping the blank at a point removed from said edge and for bending the blank about a diagonal axis to bring an adjacent edge of the blank substantially into alignment with said longitudinal edge, a creasing bar adapted to engage the margins of said blank adjacent said edges, mechanism adapted to release said first-mentioned holding means immediately after said engagement, and mechanism adapted thereupon to cause said creasing bar to fold said marginal portions along a line substantially parallel to said edges.

13. In a machine of the character described, a paper supply roll, a metal strip supply roll of narrow metal ribbon having closely spaced perforations along its median line, means for feeding the paper and the metal strip so that the paper is above the metal strip, means for cutting the paper to form a blank and for folding the blank to bring two of its edges into coincidence, means for depressing the marginal portions of the blank adjacent said coinciding edges, and said strip, along the median line of said strip so that said strip is bent into a V-shape, means for compressing the sides of the strip together about the said marginal oprtions of the blank, and means for upsetting portions of the metal between said openings to seal said strip in place.

14. In a paper cup making machine of the character described, mechanism for advancing a strip of paper and a strip of binding material, mechanism for guiding and holding the paper along the sides thereof, mechanism to sever the paper and binding strip, mechanism to register the lengthwise edges of the paper, mechanism to bind said registered edges with said binding strip, and mechanism to seal the said binding strip to said edges of the paper.

15. In a cup making machine of the character described, the combination of mechanism for advancing a strip of paper a predetermined distance, means for cutting a blank from said strip, means for guiding, during the advancing movement, the edges of the portion of the strip which form the blank, sets of jaws for gripping both of said edges, and means for bending said blank about a diagonal without creasing the bend, said bending means including means for moving one of said sets of jaws while the same grips the paper.

Signed at New York in the county of New York and State of New York this 20th day of November A D. 1920.

JOSEPH V. WECKBAUGH.